UNITED STATES PATENT OFFICE 2,402,967

METHOD OF REMOVING FLASH FROM SOFT MOLDED ARTICLES

Lewis W. Lubenow, Orange, N. J.

No Drawing. Application August 22, 1945,
Serial No. 612,135

6 Claims. (Cl. 51—282)

My invention relates to the removal of flash from soft and elastic molded articles.

Soft rubber and other flexible or elastic materials may be molded into articles of many shapes, such as washers, grommets, plugs, stoppers, etc. The molding is generally accomplished under heat and pressure. In order that the finished article may conform precisely to the shape of the mold, it is necessary that the mold be full. It is difficult to gauge the exact amount of the stock to be placed in the mold, and for this reason a slight excess, rather than an insufficiency, is always used in order to be certain that the mold is full and that the article conforms to the shape of the mold. The excess is forced out of the mold and results in the presence of fins or extensions on the molded article which are not a part of the desired shape. These extensions are commonly known as "flash." In some instances the molds are designed with a flash groove around the cavity to confine the flash to a definite pattern, and in other cases a number of small parts, such as washers, may be molded purposely with flash connecting them together to facilitate handling during molding. In some cases also where the mold is made of a plurality of parts, the soft rubber may be forced into the cracks or joints between the mold parts during the molding. This is a common form of flash, and is especially troublesome when the molds wear.

After the molding is complete, the flash must be removed. This is particularly difficult because of the flexible and elastic nature of the molded objects. Many proposals heretofore have been made for removing flash from soft molded articles, but this is generally done by hand work with scissors, knives, and other implements operated by hand to cut off the flash. This hand work is a standard practice in the industry and adds greatly to the expense of the molded objects. It also results in irregularity in the articles due to lack of uniformity in the skill of the operators. In some cases the molded objects are fed by hand to specially designed motorized trimming machines. These are expensive and require hand feeding.

It is an object of my invention to remove flash from molded objects which are flexible or elastic or both, such as those made from soft rubber, by a process which eliminates hand work on each piece, and which results in a substantial uniformity in the appearance of the finished molded products.

I have discovered in accordance with my invention that articles molded from soft rubber and similar materials which are flexible and elastic at room and other ambient temperatures at which they are used, may be cooled to a temperature at which they become hard; while at this lower temperature and in this hard condition the flash can be removed readily by agitating or tumbling in an inert liquid. For example the articles may be agitated in contact with each other or with pieces of other material, such as by tumbling in an inert liquid so that extensions or flash will be broken off or worn away; at the end of the operation the entire object will have a smooth, uniform surface, and when returned to normal temperature will assume its original physical properties.

The invention may be practiced in any of a number of different ways. For example, an agitating or tumbling apparatus may be filled or partly filled with a cold liquid that is inert with reference to the articles and which does not freeze at the desired low temperature. The liquid can be cooled by any conventional refrigerating means. The molded articles are placed in the liquid before or after it is cooled and become hard upon assuming the temperature of the cold liquid. The articles are then agitated or tumbled in the cold liquid. If desired, the liquid can be circulated through the apparatus and recooled by refrigerating means so as to maintain the desired temperature through the operation.

In some instances self-refrigeration can be accomplished such as with the use of a low boiling organic liquid, such as propane or ether, which can be maintained at the desired low temperature merely by evaporation of a proper amount of the liquid.

In a modification of such an embodiment the apparatus may contain an inert non-freezing liquid and another evaporative material such as Dry Ice (solid carbon dioxide) and this maintains the liquid at the desired low temperature. The molded objects and the pieces of Dry Ice can be tumbled together in the liquid. Preferably, however, the Dry Ice is confined in a separate adjacent compartment of the tumbling chamber, such as may be formed from perforated plates so that the liquid can circulate through the Dry Ice to maintain the low temperature of the liquid.

In these embodiments of the invention the liquid used must be inert with reference to the molded articles. The liquid to be selected must not only be non-freezing at the low temperature, but also must be selected with reference to the physical and chemical characteristics of the molded articles to be treated. The inertness of soft rubber, and other flexible and elastic materials, with reference to different low freezing liquids is well known, and the liquids can be selected without experimentation in view of these known properties. I have found methyl, ethyl, and lower alcohols to be entirely suitable for carrying out the process on articles molded from rubber, both natural and synthetic. Salt brines, aliphatic hydrocarbons, chlorinated hydrocarbons, and other similar organic liquids can be used if selected with proper precautions.

The temperatures required will depend upon the flexible or rubber-like material being treated. Some materials become hard at temperatures not too far below room temperatures, such as 0° F. Others are compounded so as to retain their flexibility at relatively low temperatures so as to resist cold climates and atmospheric conditions at high altitudes. For economic reasons the temperature selected will not be lower than that necessary to cause the rubber article to be hard enough to have the flash removed. The temperature also must not be so low as to cause the material to become so brittle that the article itself is broken. The temperature selected can readily be determined without experimentation from the known or ascertainable properties of the molded article to be treated. For most of the molded soft rubber (natural and synthetic) articles which are encountered in commerce, the temperature obtained by Dry Ice in alcohol is entirely satisfactory, i. e., —25° to —85° F. In view of the inexpensiveness of Dry Ice, this is a preferred embodiment of my invention, at least for small installations.

If the process is applied to cup-shaped or tubular shaped articles having thin wall sections, they can be reenforced by inserting suitably formed wooden or other supporting blocks prior to this process, thereby preventing breakage of parts during flash removal.

The nature of the apparatus used in the process is not critical, provided it is suitable for the process, i. e., properly insulated and constructed to agitate the molded objects at the low temperature. In general it may consist of a barrel or other container which can be rotated or agitated in an inert liquid, together with means for cooling said inert liquid. The molded articles may be cooled in any manner and placed in the apparatus which is rotated or agitated, or the articles may be cooled after being placed in the apparatus. As the articles move upon each other during the agitation, the thin fins or flash are broken off because they are fragile when hard. The body of the molded article, although hard, has enough bulk to resist breaking. As the tumbling is continued, the friction and wear of the pieces upon each other produce a smooth surface.

Adjacent the tumbling compartment a Dry Ice compartment may be provided and a liquid may be circulated through the Dry Ice compartment and then in contact with the molded objects to chill them and maintain them at the low temperature.

In order to remove the flash efficiently and quickly it is generally desirable to agitate or tumble the frozen articles with shot, stones or particles of hard material. This will aid in removing flash from remote corners or crevices on the article. In some instances a plurality of such materials may be used, and a plurality of tumbling operations at different temperatures and with the articles of different hardness, may be employed. The first operation, for example, may be with coarse shot, and the finishing operation may be with a finer material.

After operation has been completed, the articles are restored to an ambient temperature, and they regain their original flexible, elastic and other physical properties without being harmed by the treatment.

The invention is applicable to the removal of flash from any soft flexible or elastic molded objects such as made from rubber, balta, gutta-percha, vulcanized oils, and the various synthetic rubbers and plastics which have these properties, such as butadiene, isoprene, vinyl and acrylic polymers and copolymers. By "soft" and "flexible" I refer to the usual properties described by this word, namely, the ability to be deformed by pressure such as can be exerted by the fingers. By the word "elastic" I refer to the well-known property of the returning of an object to its original shape after being deformed.

Methods of performing the invention other than I have described as illustrative will be apparent to those skilled in the art, and the various details as to how the temperatures are achieved and maintained, and the precise form of the apparatus and operation can be varied without departing from the invention if within the following claims.

I claim:

1. A method of removing flash from articles molded from a normally soft and elastic material which comprises cooling the articles in an inert liquid to a temperature at which the flash becomes hard and loses its softness and elasticity, and then tumbling the articles in the liquid in this condition to remove the hardened flash therefrom.

2. A method of removing flash from soft rubber molded articles, which comprises tumbling them in an inert liquid at a temperature at which the flash is hard.

3. A method of removing flash from soft rubber molded articles, which comprises tumbling them in alcohol which is in contact with Dry-Ice.

4. A method of removing flash from articles molded from a normally soft and elastic material, which comprises tumbling them in an inert liquid at a temperature at which the flash is hard.

5. A method of removing flash from articles molded from a normally soft and elastic material, which comprises tumbling them in an inert liquid in a tumbling zone at a temperature at which the flash is hard, cooling an inert liquid to said temperature in a cooling zone, and circulating said cooled liquid from said cooling zone to said tumbling zone.

6. A method of removing flash from articles molded from a normally soft and elastic material, which comprises tumbling said articles in an inert liquid at a temperature at which the flash is hard and in contact with pieces of normally hard material to aid in removing said flash during the tumbling.

LEWIS W. LUBENOW.